L. E. PARLIMAN.
THERMOMETER.
APPLICATION FILED AUG. 13, 1912.
1,081,139.
Patented Dec. 9, 1913.
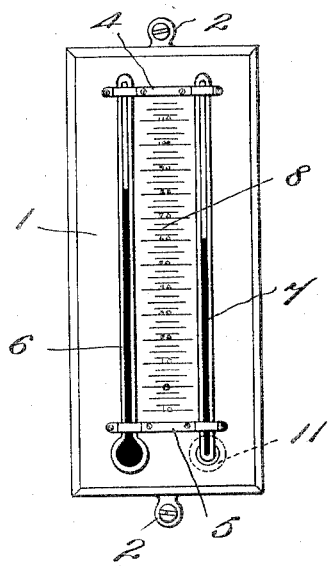
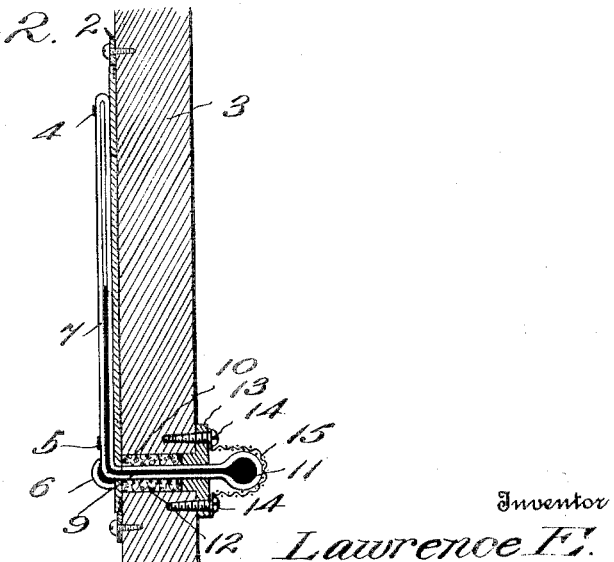

UNITED STATES PATENT OFFICE.

LAWRENCE E. PARLIMAN, OF SEA CLIFF, NEW YORK.

THERMOMETER.

1,081,139.  Specification of Letters Patent.  Patented Dec. 9, 1913.

Application filed August 13, 1912. Serial No. 714,833.

*To all whom it may concern:*

Be it known that I, LAWRENCE E. PARLIMAN, a citizen of the United States, residing at Sea Cliff, Long Island, in the county of Nassau and State of New York, have invented new and useful Improvements in Thermometers, of which the following is a specification.

This invention relates to thermometers and has for its object to provide a simple, cheap and highly efficient device of this kind, whereby the temperature of the outside atmosphere may be determined as well as that of the inside.

To these ends the invention consists in the novel details of construction and combination of parts more fully hereinafter described and particularly pointed out in the claim.

Referring to the accompanying drawings forming a part of this specification in which like numerals designate like parts in all the views:—Figure 1 is a front elevational view of my improved device, and Fig. 2 is a longitudinal sectional view thereof showing the device attached to a wall.

My improved thermometer comprises a base 1 on each end of which is secured the fastening lug 2 for securing the thermometer to a wall or partition 3, on the inside of a room or building. Held to the front of the base and spaced an equal distance apart by two stays 4 and 5, are two thermometer tubes 6 and 7 between which is the usual scale 8 for determining the different degrees of temperature. The tube 6 is of the usual form as employed on the ordinary thermometer now in use, but the tube 7 is bent at right angles at its lower end to form a horizontal extension 9 which is adapted to project through a hole 10 in the wall or partition 3 into the outside atmosphere, and is provided on its outer end with the usual bulb 11. After the thermometer has been placed in position on a wall as shown in Fig. 2, the hole 10, around the tube, is plugged with any suitable material 12 and closed at its outer end with a bushing 13, which bushing is split to allow of it being secured in place. The bushing is held in position by means of the screws 14, which screws also hold a small screen or basket 15, adapted to incase the bulb 11 and protect the same against injury.

From the foregoing it may be noted that by the employment of a device constructed in accordance with my invention, the temperatures of both the inside and outside atmosphere may be determined at a glance and that the manner now in vogue of hanging a thermometer outside of a window, may be eliminated. The device may be placed in any convenient place in a room or building but may be more readily applied to the window sash.

It is obvious that those skilled in the art may vary the details of construction and arrangements of parts without departing from the spirit of my invention and therefore I do not wish to be limited to such features except as may be required by the claim.

What is claimed as new is:

A thermometer comprising a base adapted to be fastened to the inside wall of a room and provided with a graduated scale, a tube mounted on the base and arranged for coöperating with the scale to indicate the temperature of the room, a second tube having its bulb portion extending through the wall and into the external atmosphere, packing around the tube within the house-wall, a bushing forming a plug to retain the packing and further forming a collar for the tube, a basket fitted over the outside bulb and forming a guard therefor, and means securing the basket and bushing to the outside wall, substantially as described.

In testimony whereof I affix my signature in presence of two witnesses.

LAWRENCE E. PARLIMAN.

Witnesses:
 JOHN A. DONEGAN,
 GEO. A. BYRNE.